(12) United States Patent
Sung

(10) Patent No.: US 11,466,670 B2
(45) Date of Patent: Oct. 11, 2022

(54) HEAT DRIVEN TURBINE AND METHOD OF USING THE SAME

(71) Applicant: Doris Sung, Rolling Hills, CA (US)

(72) Inventor: Doris Sung, Rolling Hills, CA (US)

(*) Notice: Subject to any disclaimer, the term of this patent is extended or adjusted under 35 U.S.C. 154(b) by 0 days.

(21) Appl. No.: 16/391,141

(22) Filed: Apr. 22, 2019

(65) Prior Publication Data

US 2021/0246826 A1 Aug. 12, 2021

(51) Int. Cl.
*F03G 7/06* (2006.01)
*F03G 3/00* (2006.01)
*F03G 6/00* (2006.01)

(52) U.S. Cl.
CPC .............. *F03G 7/06* (2013.01); *F03G 3/00* (2013.01); *F03G 3/091* (2021.08); *F03G 6/00* (2013.01); *F03G 6/002* (2021.08); *F03G 7/0613* (2021.08); *F03G 7/0633* (2021.08); *F03G 7/0641* (2021.08)

(58) Field of Classification Search
CPC ... F03G 7/06; F03G 7/065; F03G 7/10; F03G 6/00; F03G 3/00; F03G 3/02; F03G 7/00; F03G 7/0613; F03G 7/0633; F03G 7/0641; F03G 6/002; F03G 3/087; F03G 3/091; F05D 2220/30; F05D 2240/30; F01D 5/28; F01D 5/141; F01K 27/00
USPC ......................................................... 60/529
See application file for complete search history.

(56) References Cited

U.S. PATENT DOCUMENTS

| | | | | |
|---|---|---|---|---|
| 3,630,020 A | * | 12/1971 | Chase | B64G 1/36 60/529 |
| 4,037,411 A | * | 7/1977 | Hochstein | F03G 7/065 60/527 |
| 6,226,992 B1 | * | 5/2001 | Kutlucinar | F03G 7/065 60/527 |
| 2002/0019189 A1 | * | 2/2002 | Blonder | E06B 7/02 446/14 |

FOREIGN PATENT DOCUMENTS

| | | | | | |
|---|---|---|---|---|---|
| DE | 2836253 A1 | * | 2/1980 | | F03G 7/06 |
| GB | 307596 A | * | 3/1929 | | F03G 7/06 |
| JP | 58067976 A | * | 4/1983 | | F03G 7/06 |
| WO | WO-2019162754 A1 | * | 8/2019 | | F03G 3/00 |

* cited by examiner

*Primary Examiner* — Mark A Laurenzi
*Assistant Examiner* — Xiaoting Hu
(74) *Attorney, Agent, or Firm* — FisherBroyles, LLP; Rob L. Phillips

(57) ABSTRACT

A thermobimetal heat driven turbine having a rotor, and a series of vanes extending from the rotor wherein the vanes comprise two or more separate materials laminated together, said two separate materials having different coefficients of expansion whereby exposure to a heat source causes the two separate materials to expand at different rates thereby re-shaping the vanes to drive the rotor. The rotating turbine is thus able to generate power using direct heat from an energy source. The heat source may be radiant, convection and/or conduction type heat.

13 Claims, 9 Drawing Sheets

HEAT DRIVEN TURBINE AND METHOD OF USING THE SAME

FIELD OF THE INVENTION

The embodiments of the present invention relate generally to turbine driven by a heat source.

BACKGROUND

Global warming, pollution and other drawbacks associated with fossil fuels have fostered the harnessing of clean energy from solar, wind, geothermal and water sources. Despite the advances in such clean energy, there remains a need for additional clean energy sources including new clean energy sources that operate in locations where others may not.

Thus, it would be advantageous to develop a turbine driven by a heat source including a radiant, convection or conduction heat source.

SUMMARY

The embodiments of the present invention include a heat driven turbine having a rotor, a base supporting said rotor; and a plurality of vanes extending from said rotor, said vanes each fabricated of at least two separate materials, said at least two separate materials having different coefficients of expansion whereby exposure to a heat source causes said at least two materials to expand at different rates thereby re-shaping the vanes to rotationally drive the rotor relative to said base.

Another embodiment comprises a vane for a heat driven turbine comprising: at least two separate materials having different coefficients of expansion whereby exposure to a heat source causes said at least two separate materials to expand at different rates thereby re-shaping said vanes such that when joined to a rotatable rotor, said re-shaping of said vanes causes said rotatable rotor to rotate.

As described herein, the re-shaping of the vanes caused by the heat source including direct solar energy re-distributes the perimeter masses of the vanes and uses gravitational force, centrifugal/centripetal force and/or momentum to make the system move/rotate. The re-shaping is in the form of curling or curvature of the vanes. The heat driven turbine is uncomplicated, relatively inexpensive, efficient and easy to manufacture, maintain and repair.

Other variations, embodiments and features of the present invention will become evident from the following detailed description, drawings and claims.

DETAILED DESCRIPTION

Figure 1A:
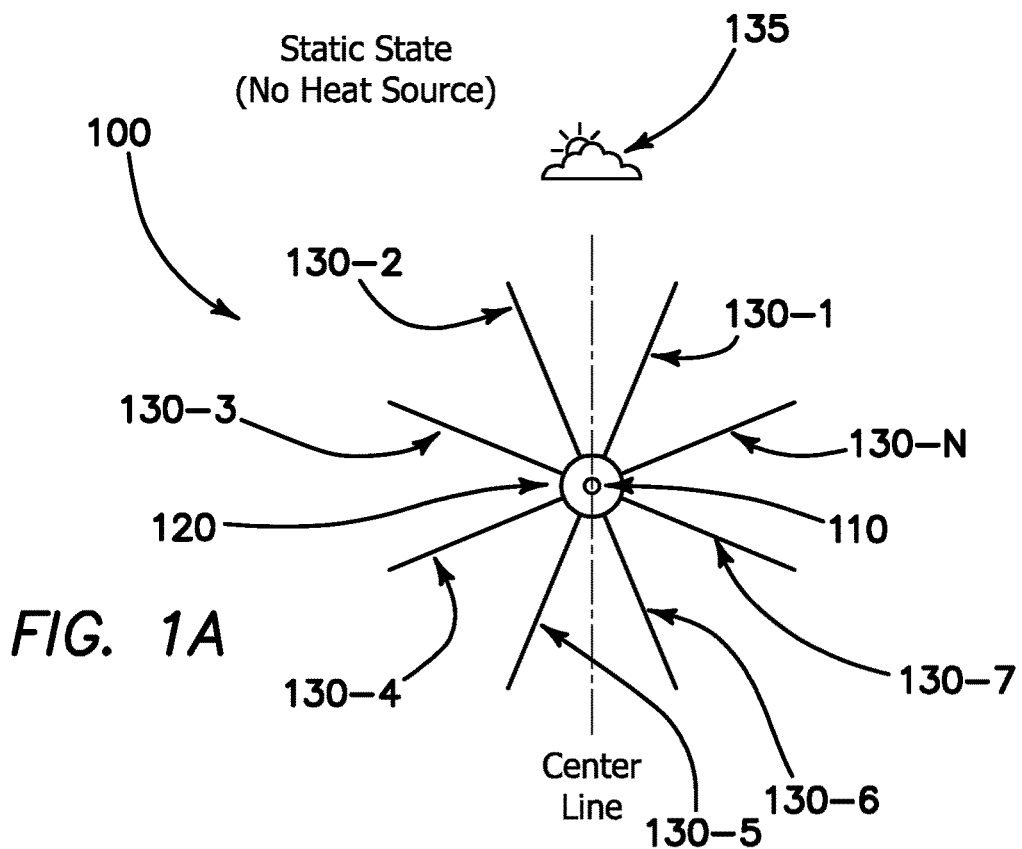
FIGS. 1A and 1B illustrate diagrams of a thermobimetal solar turbine in a static state and rotational state, respectively, according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

In broad terms, the heat driven turbine detailed herein utilizes vanes fabricated of two materials having different coefficients of expansion (i.e., expansivities). In one embodiment, the materials are thermobimetals. As used herein a thermobimetal (aka thermostatic metal, thermal bimetal, bimetal, etc.) is a composite material comprising two materials of any appropriate nature, metallic or otherwise, which, due to the differing expansivities of the components, tends to alter its curvature when its temperature is changed. The two alloys may be fused, bonded, sonically welded, thermally welded, glued, fastened, adhered or otherwise joined to one another to form the vane. It is conceivable that more than two materials may be used to form the vanes. For example, an inert material may be used with the thermobimetal material or more than two thermo-materials may be used in certain desirable combinations. In addition, while thermobimetals are detailed below, non-thermobimetals (e.g., plastic, glass, wood, composites, etc.) each having a different co-efficient of expansion may be used to create the vanes as well. Moreover, while the detailed description below focuses on a turbine driven by solar energy, the turbine according to the embodiments of the present invention may be driven by any heat source as detailed below.

Figure 1B:
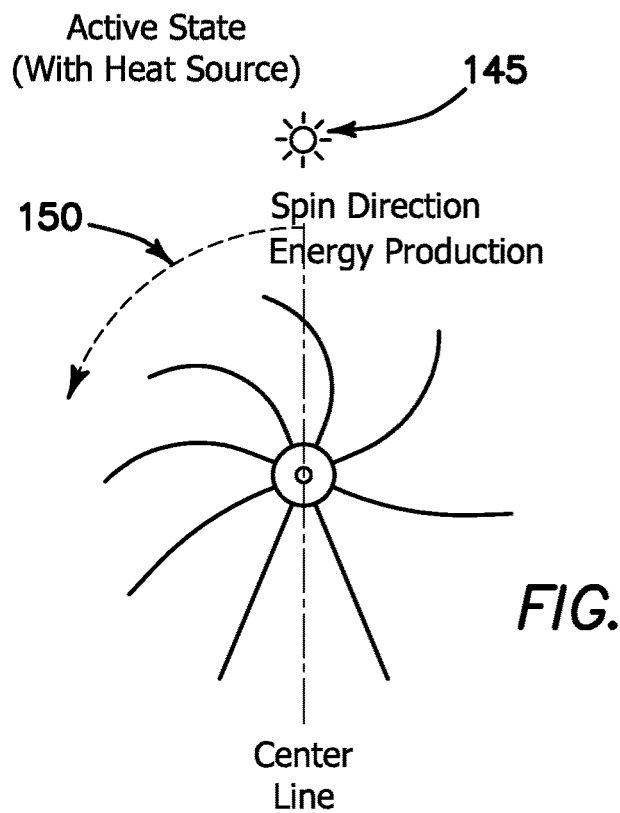

FIGS. 1A and 1B show diagrams of a thermobimetal solar turbine in a static state and an active rotational state, respectively, according to the embodiments of the present invention. FIG. 1A shows a thermobimetal solar turbine 100 having a center axle 110, rotor 120 and a plurality of vanes 130-1 through 130-N. In FIG. 1A, no direct solar energy is being applied due to cloud cover 135. In FIG. 1B, the thermobimetal solar turbine 100 is subjected to direct solar energy 145 causing the vanes 130-1 through 130-N to re-shape (i.e., flex, bow or bend) thereby causing rotational movement 150 in the direction of the flex.

A bimetal strip made of two components and exposed to heat alters its curvature according to the expression set forth in Table 1. Other materials alter their curvature according to different expressions.

TABLE 1

$$\frac{1}{R_T} - \frac{1}{R_O} = \frac{6(a_2 - a_1)(1+m)^2}{3(1+m)^2 + (1+m*n)\left(m^2 + \frac{1}{m*n}\right)} * \frac{T - T_0}{s}$$

Meaning of Terms

| | |
|---|---|
| $R_T$ | Radius at temperature T |
| $R_O$ | Radius at temperature $T_0$ |
| $m = s_1/s_2$ | $s_1$ and $s_2$ represent the thicknesses of the component alloys |
| $n = E_1/E_2$ | $E_1$ and $E_2$ are moduli of elasticity of the component alloys |
| $\alpha_1$ and $\alpha_2$ | coefficients of linear thermal expansion of component alloy I and II respectively |

Figure 9A:
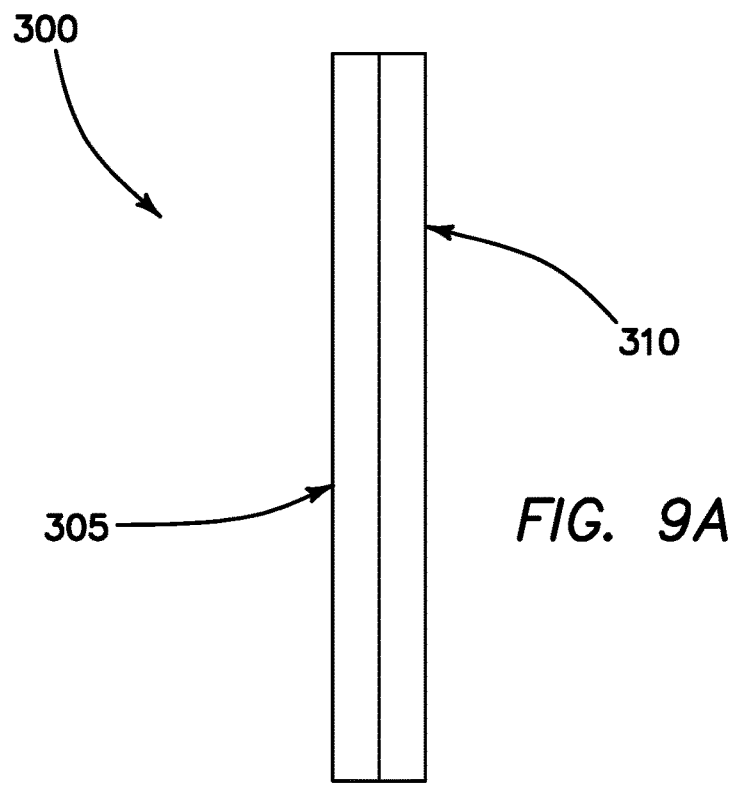
FIGS. 9A through 9C show cross-sectional views of a vane according to the embodiments of the present invention.
Figure 9B:
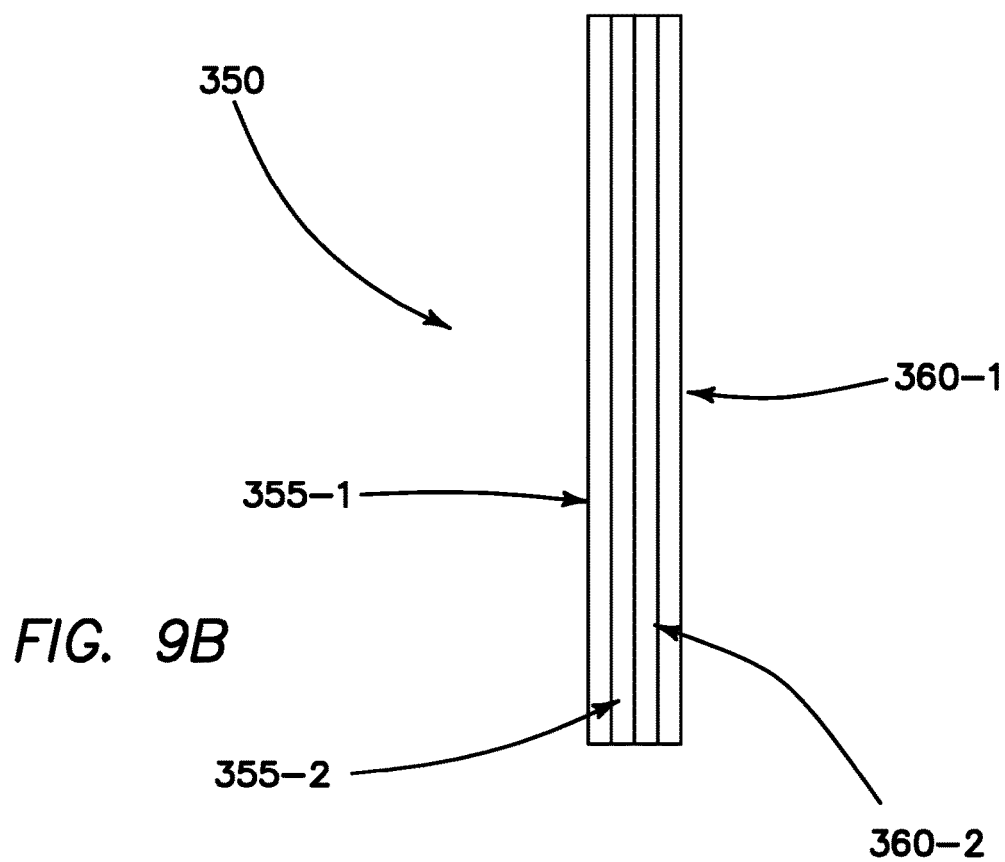
Figure 9C:
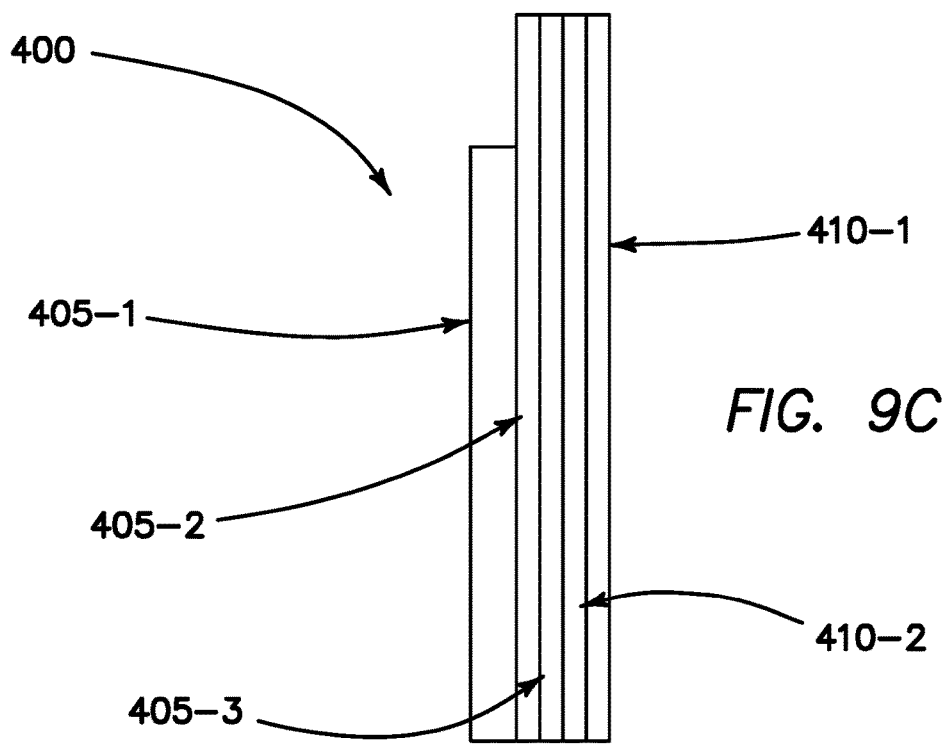
Figure 10A:
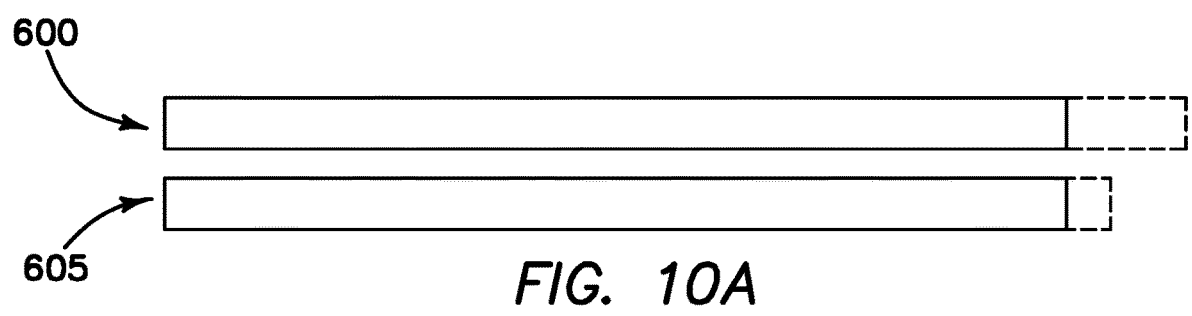
FIGS. 10A and 10B show two sheets of different alloys used to form a vane and the vane in a flexed condition according to the embodiments of the present invention.
Figure 10B:
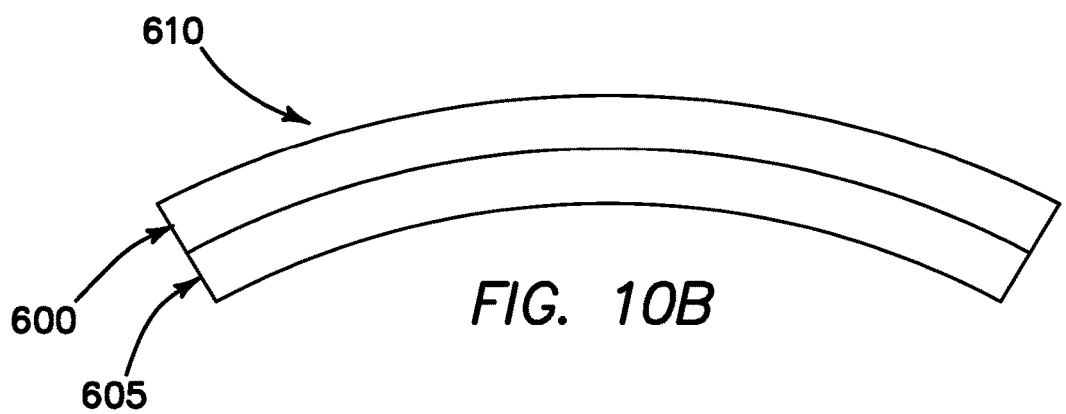

The re-shaping of the vanes 130-1 through 130-N is generated by the differing coefficients of expansion of the laminated alloys. More specifically, as the one or more layers of alloy 1 expand at rate 1 and the one or more layers of alloy 2 expand at rate 2, the vanes 130 tends to flex or bow causing movement due to the re-distribution of the perimeter masses of the vanes 130. FIG. 10A shows two vane members 600, 605 of different alloys with vane member 600 having a coefficient of expansion (expansion being represented by the dotted portion of each vane member 600, 605) greater than that of vane member 605 such that when the two vane members 600, 605 are joined to form a vane 610, and the vane 610 is heated, the vane 610 bends in the downward direction. As shown, in FIG. 1B, the direction of movement is counter-clockwise but by reversing the lamination order, the system may be made to rotate clockwise. FIG. 9A shows a cross-sectional side view of a vane 300 with one layer 305 of a first alloy and one layer 310 of a second alloy. FIG. 9B shows a cross-sectional side view of a vane 350 with two layers 355-1, 355-2 of a first alloy and two layers 360-1, 360-2 of a second alloy. Those skilled in the art will recognize that the two alloys may be made up of a different number of layers and need not have the same thickness or dimensions as one another or as the other alloy as shown in FIG. 9C. FIG. 9C shows a cross-sectional side view of a vane 400 with three layers 405-1, 405-2 and 405-3 of a first alloy and two layers 410-1, 410-2 of a second alloy.

Figure 2:
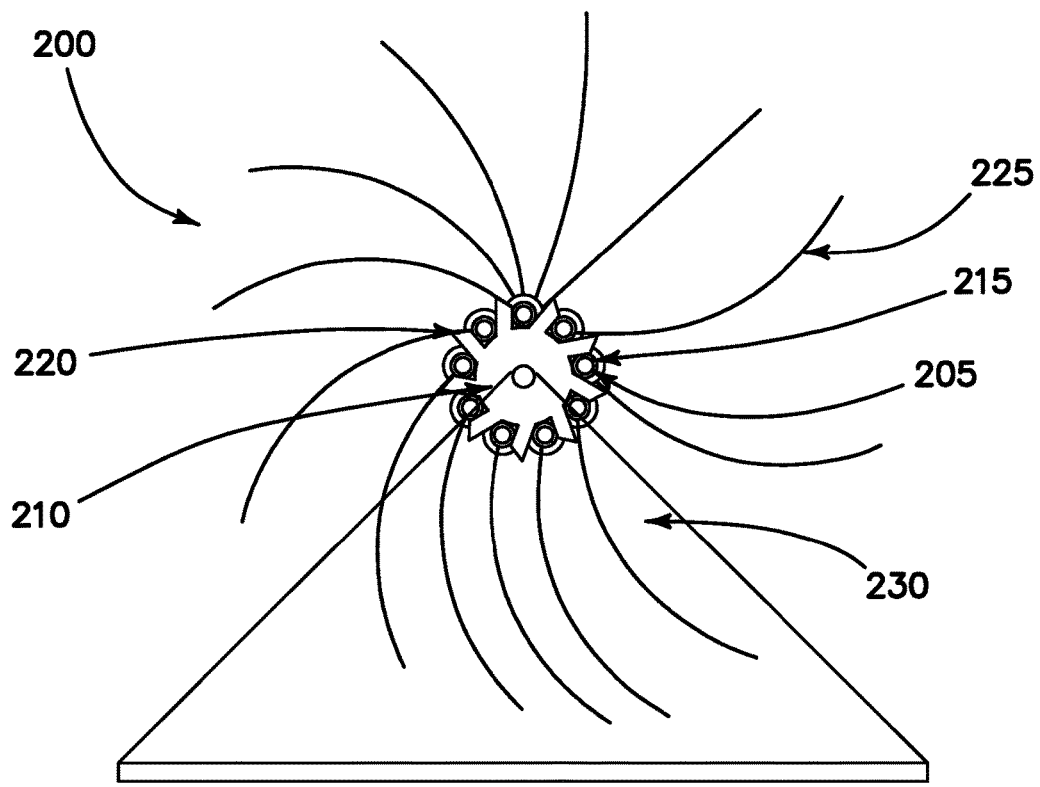
FIG. 2 illustrates a side view of a first exemplary thermobimetal solar turbine according to the embodiments of the present invention.
Figure 3:
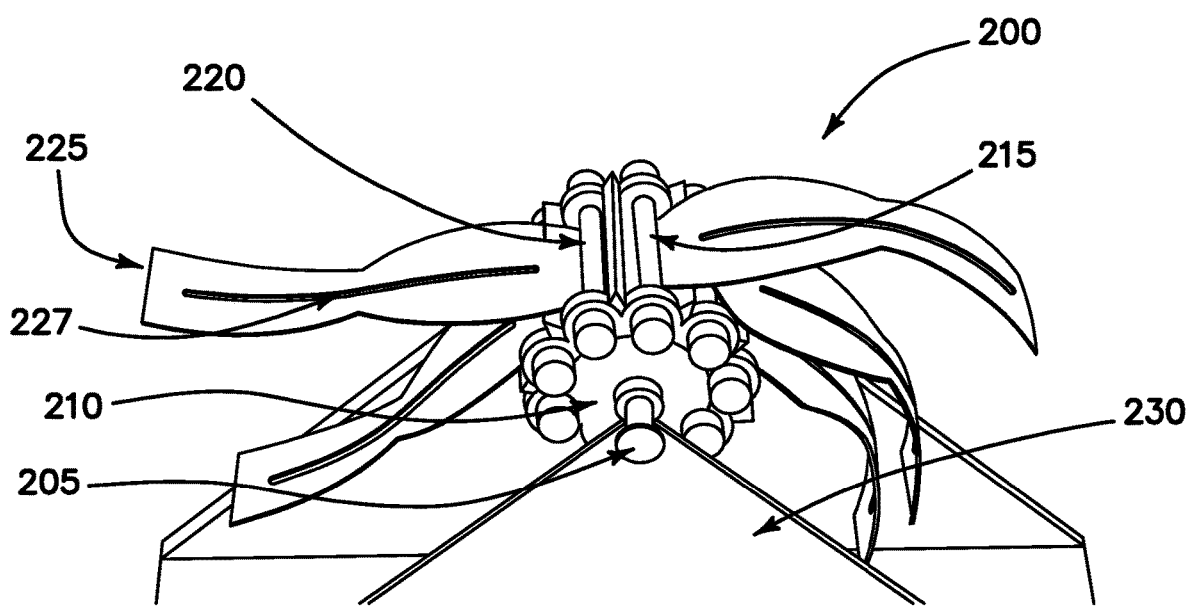
FIG. 3 illustrates an upper perspective view of the first exemplary thermobimetal solar turbine in more detail according to the embodiments of the present invention.

FIGS. 2 and 3 show a first exemplary thermobimetal solar turbine 200 according to the embodiments of the present invention. As shown, the thermobimetal solar turbine 200 includes a spindle or axle 205, rotor 210, trigger pins 215, spokes 220 and vanes 225. The thermobimetal solar turbine 200 is rotatably supported by a base 230. Specifically, ends of the axle 205 rest unencumbered in spaced cut-outs 231 in the base 230. Grease or other lubricants and/or low resistance materials, may provide means for reducing friction between the axle 205 and cut-outs 231. In this embodiment, one end of each vane 225 is attached to the rotor 210 via insertion into a slot 216 (best seen in FIG. 3) along the length of each of the trigger pins 215. The spokes 220 provide structural support for the trigger pins 215 and vanes 225. As shown in FIG. 3, the vanes 225 may include cutouts 227 or other opening and take any suitable shape.

Figure 4:
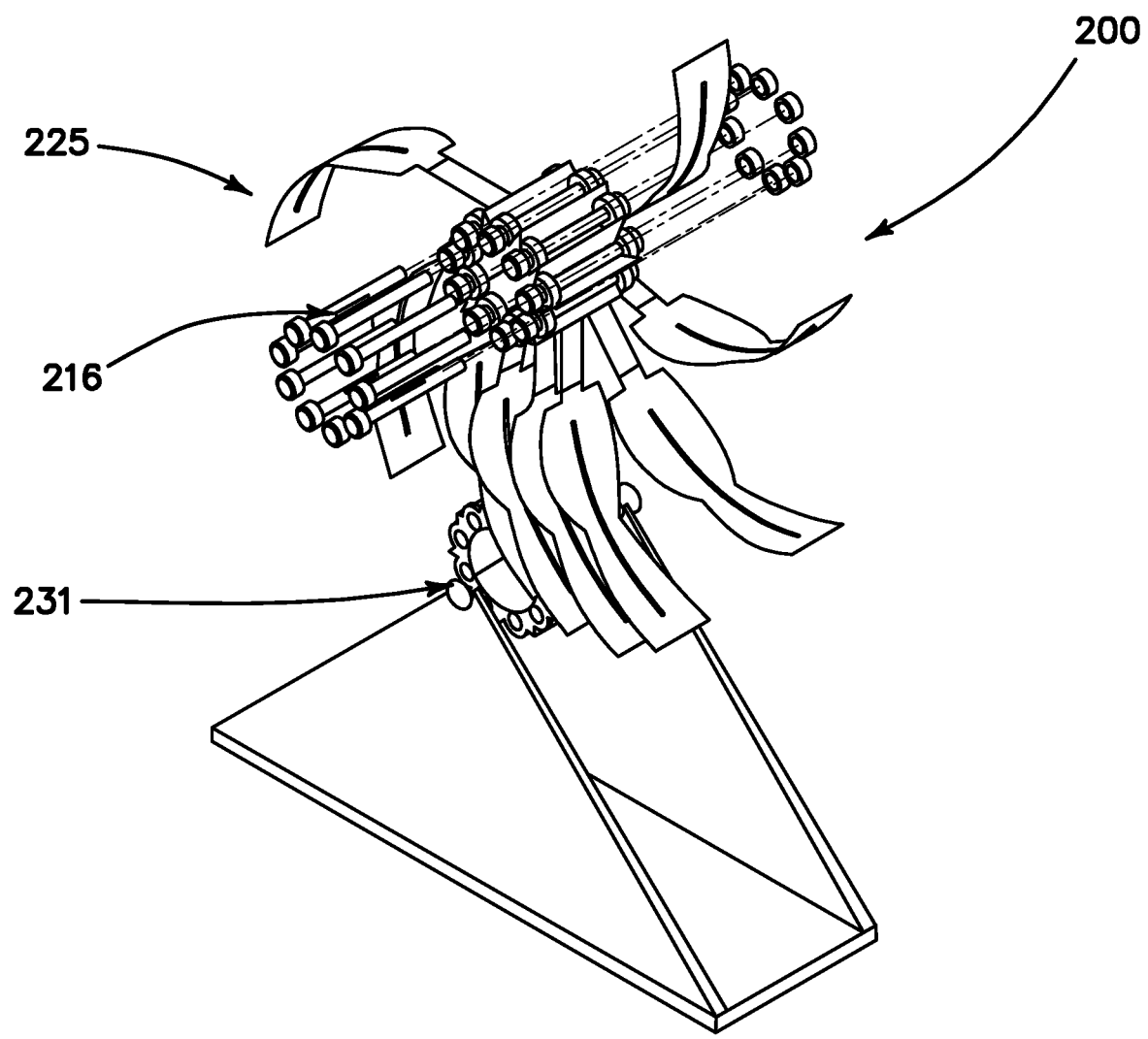
FIG. 4 illustrates a first exploded view of the first exemplary thermobimetal solar turbine according to the embodiments of the present invention.

Now referring to FIG. 4, an exploded view of the thermobimetal solar turbine 200 is shown. Slots 216 in the trigger pins 215 are observable in this exploded view. Those skilled in the art will recognize that the vanes 225 may be connected to the trigger pins 215 using any suitable means including fasteners, welds, bonding, etc.

Figure 5:
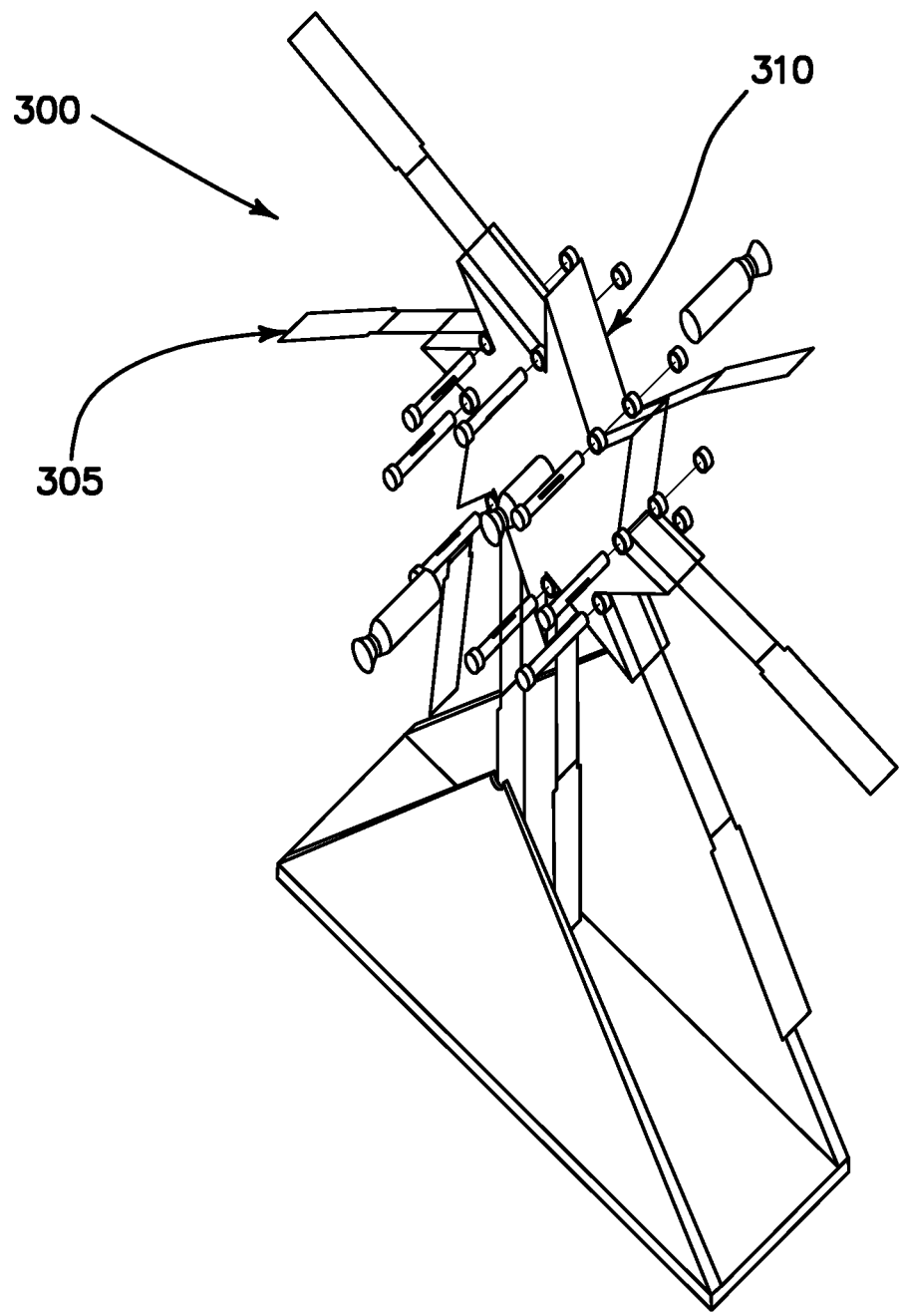
FIG. 5 illustrates an exploded view of a second exemplary thermobimetal solar turbine according to the embodiments of the present invention.

FIG. 5 shows an exploded view of a second exemplary thermobimetal solar turbine 300 according to the embodiments of the present invention. Thermobimetal solar turbine 300 is similar in design to thermobimetal solar turbine 200 but includes vanes 305 of an alternative shape and a thinner rotor 310.

FIGS. 2 through 5 represent a heat driven turbine configured to use centrifugal and gravitational forces by using a "throwing" movement responsive to a heat source to drive the turbine while the turbine in FIGS. 6 through 8 below represent a heat driven turbine configured to use gravitational force by weight distribution.

Figure 6:
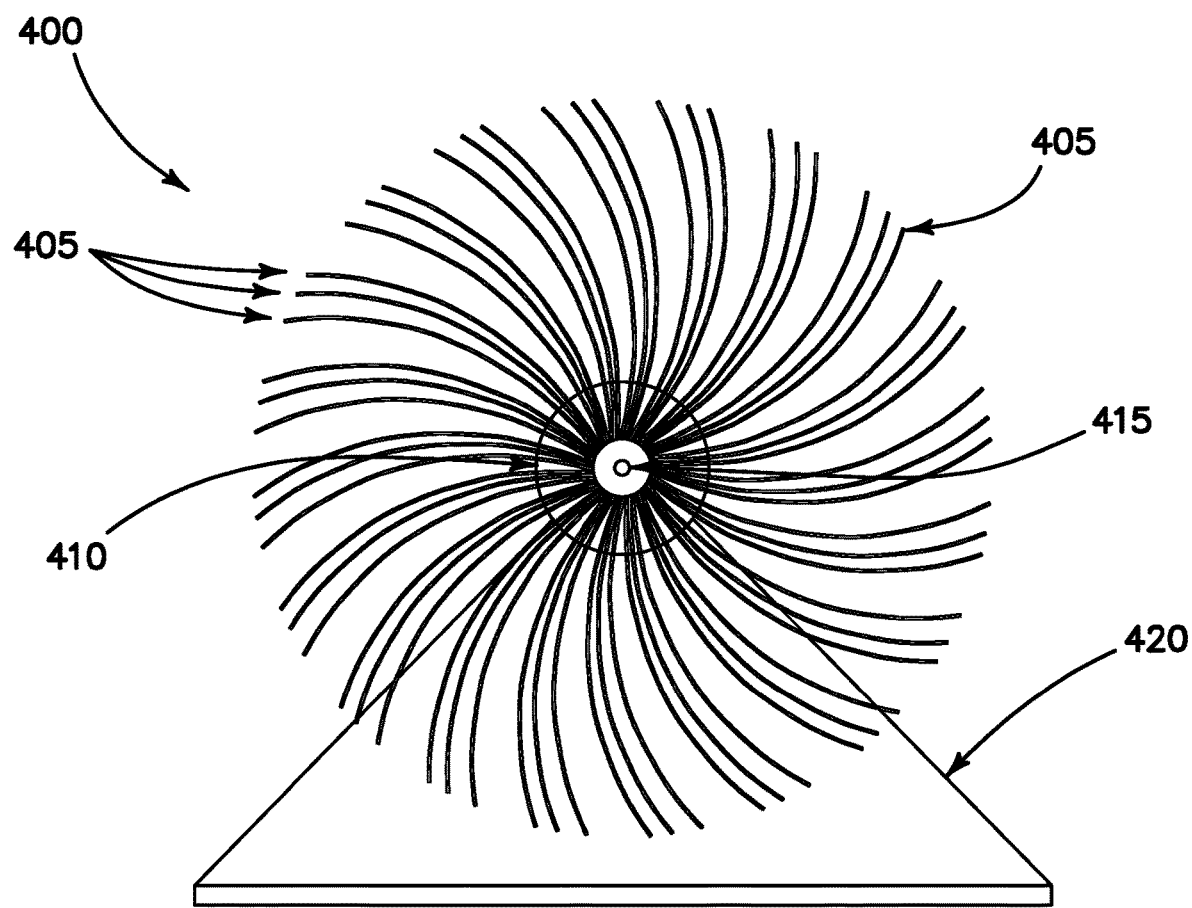
FIG. 6 illustrates a side view of a third exemplary thermobimetal solar turbine according to the embodiments of the present invention.
Figure 7:
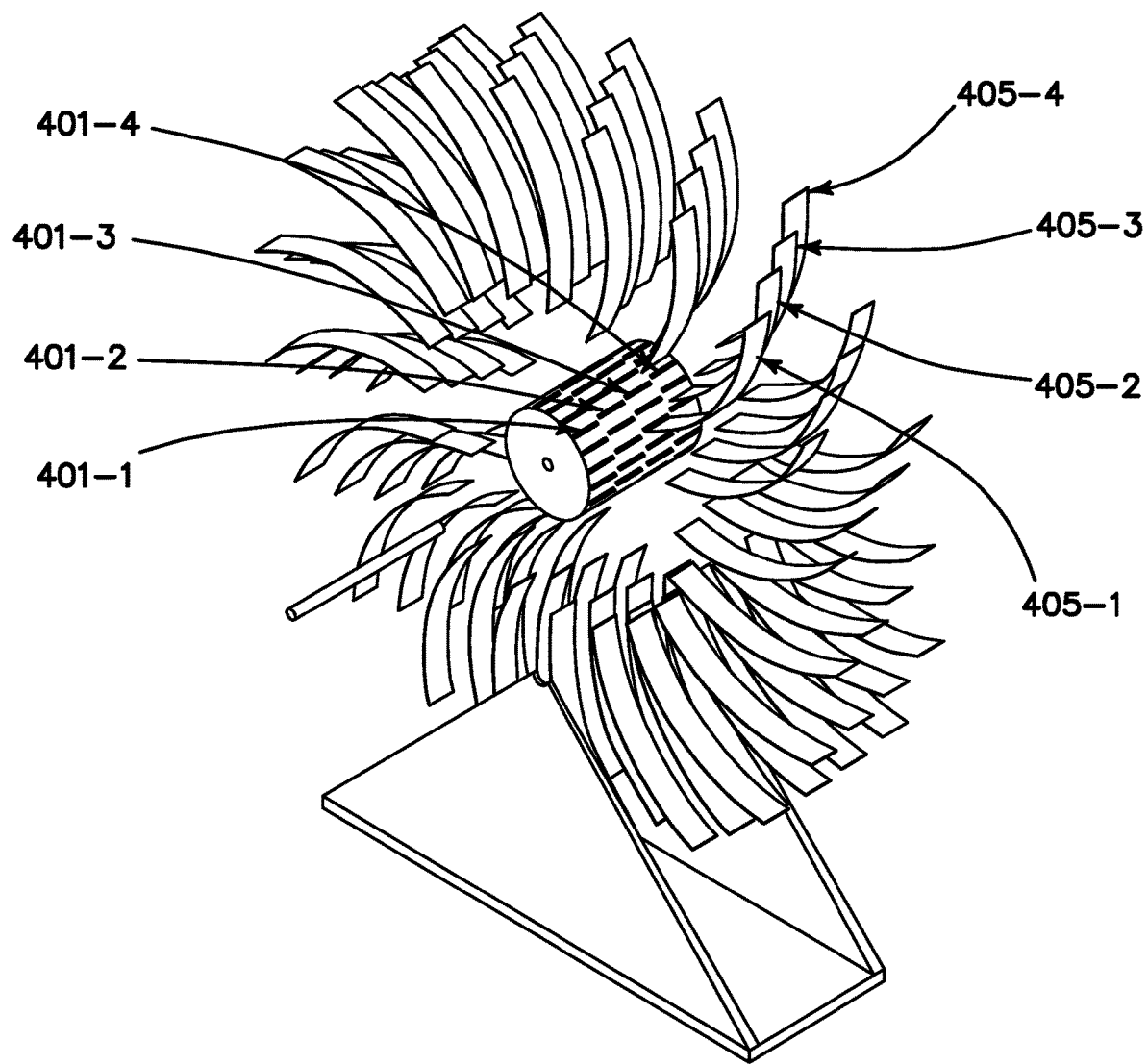
FIG. 7 illustrates an exploded view the third exemplary thermobimetal solar turbine in more detail according to the embodiments of the present invention.

FIGS. 6 and 7 show a third exemplary thermobimetal solar turbine 400 according to the embodiments of the present invention. In this embodiment, vanes 405 are positioned in a staggered manner along a width of the rotor 410. Like thermobimetal solar turbines 200 and 300, thermobimetal solar turbine 400 includes a spindle 415 and base 420. As best seen in FIG. 7, the rotor 410 is sufficiently wide or elongated to support a plurality of rows of slightly staggered slots 401-1 through 401-4 and associated vanes 405-1 through 405-4.

Figure 8:
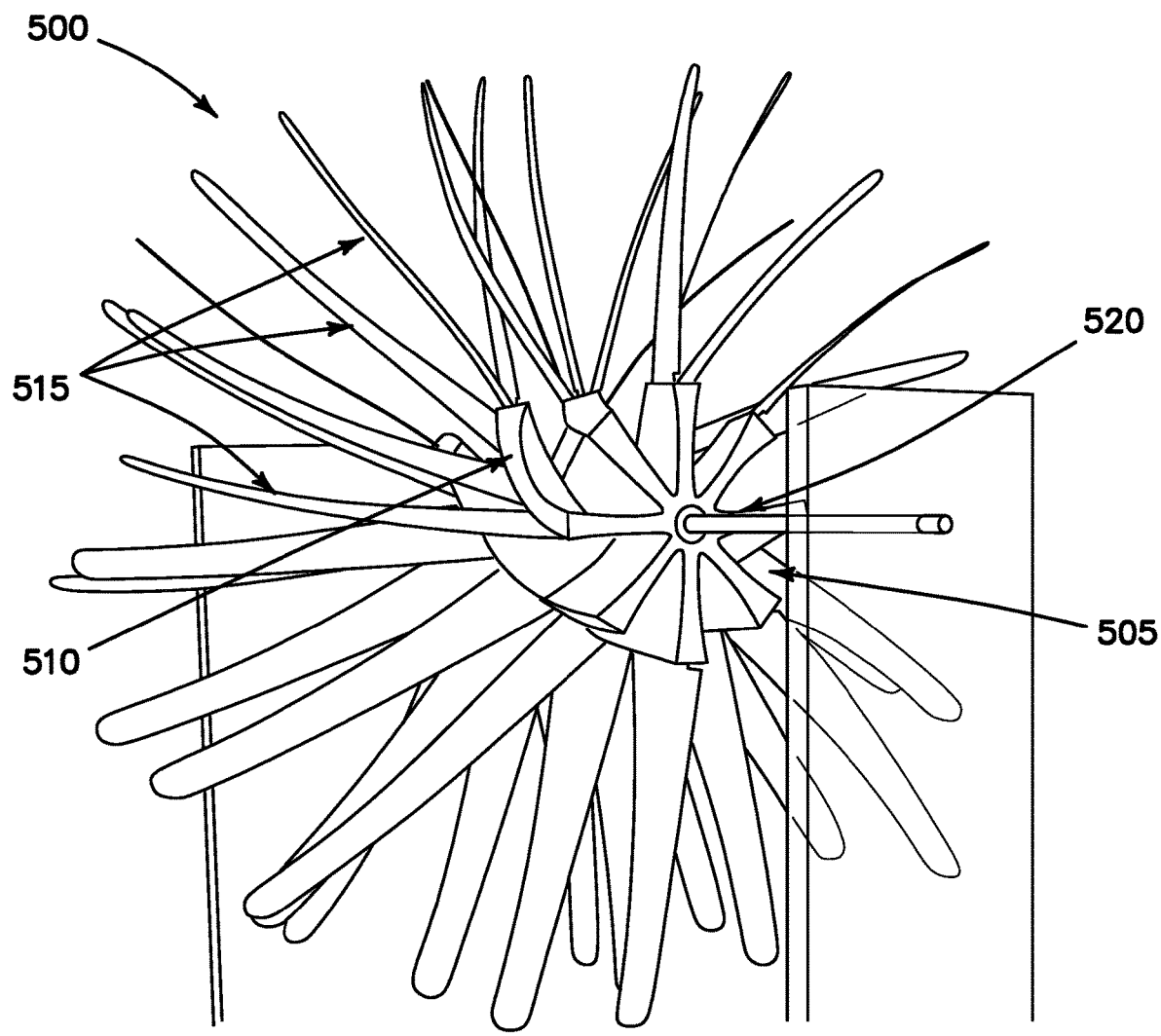
FIG. 8 illustrates a side view of a fourth exemplary thermobimetal solar turbine according to the embodiments of the present invention.

FIG. 8 shows a side view of a fourth exemplary thermobimetal solar turbine 500 according to the embodiments of the present invention. In this embodiment, the rotor 505 is formed of a series of curved blades 510 which each support multiple vanes 515. As shown, an axle 520 supports the rotor 505. Depending on the embodiment, the rotor may have integral rods, axles or extensions configured to fit cut-outs of the base or may be separate components as shown in FIG. 8.

The heat-driven turbine detailed herein operates to rotate as one side (e.g., top) of the turbine is heated while the other side (e.g., bottom) is maintained in a cooler state (or at a lower temperature) than the side subjected to heat from the heat source. That is, depending on the embodiment, the heat source is directed at the turbine from a single (and sometimes specific) direction (e.g., top). In many cases, a "radiant" heat source (e.g., the sun, a heat lamp, infrared heater, etc.) causes rotation of the turbine. In other embodiments, "convection" heat may be used as long as it is flowing from a single direction (e.g., a heat gun, forced air heat source, etc.). In other embodiments, heat can also be "conducted" into the system to the vanes on one side only (momentarily and intermittently by using an electrical source or current). Such an embodiment works especially well when the vanes are fabricated of highly conductive metals. Combinations of heat sources may be used as well. A lone, simple "ambient" heat will not cause the turbine to rotate because such heat does not allow one side of the turbine to stay cooler.

In practice, the alloys selected to form the vanes of the thermobimetal solar turbine according to the embodiments of the present invention need only have differing coefficients of expansion to provide the activity detailed herein. Those skilled in the art will understand that certain combinations of alloys generate better results than others such that the chosen alloy combinations are based on the desired result, temperatures to be endured, efficiencies desired, etc. By way of reference and in no way limiting, Table 2 shows a list of certain common materials and corresponding coefficients of expansion. Using Table 2 as a reference, a vane can be made of aluminum and any other listed material with aluminum being the high expansion alloy. For example, a vane formed of the combination of aluminum and platinum will act differently than a vane formed of aluminum and brass given the differences in the magnitudes of the coefficients of expansion of the alloys forming the vanes. In one exemplary model, applicant has used two alloys according to the specifications listed in Table 3.

TABLE 2

| MATERIAL | FRACTIONAL EXPANSION PER DEGREE F ($\times 10^{-6}$) |
|---|---|
| Glass | 5 |
| Glass, pyrex | 2.2 |
| Quartz, fused | .33 |
| Aluminum | 13 |
| Brass | 11 |
| Copper | 9.4 |
| Iron | 6.7 |
| Steel | 7.2 |
| Platinum | 5 |
| Tungsten | 2.4 |
| Gold | 7.8 |
| Silver | 10 |

TABLE 3

| MATERIAL DESIGNATION P675R HAVING 2 LAYERS | SPECIFICATIONS |
|---|---|
| High Expansion Alloy | Weight % = 52.8 Chemistry - 72% Mn, 18% Cu and 10% Ni |
| Low Expansion Alloy | Weight % = 47.2 Chemistry - 36% Ni, 64% Fe (aka Invar) |
| ASTM Flexivity (50-200° F. temp range) | 217 (in/in)/° F. $\times 10^{-7}$ |
| Maximum Sensitivity Temperature Range | 0 to 400° F. |
| Modulus of elasticity $\epsilon$ | 19.0 lbs/sq. in. $\times 10^{-6}$ |

In practice the thermobimetal solar turbine is used to generate electricity in a conventional turbine fashion (i.e., converting motion into electricity). For example, the rotor may be connected to a generator which, in a conventional manner, receives the rotor movement as an input and creates electricity as the output.

For purposes of clarity, the vanes of the turbine may be any thickness, shape or size; can have multiple blades per slot; and can be angled, curled, flat or folded. Those skilled in the art will recognize that colors, patterns, coatings can affect the performance of the vanes. The rotors can be any shape, diameter or width; the rotor may have any length and support any number of vanes; and the slots and the sleeves of the rotor can be angled, curved or aligned with an axle. The base may take any shape, size or form.

Although the invention has been described in detail with reference to several embodiments, additional variations and modifications exist within the scope and spirit of the invention as described and defined in the following claims.

I claim:

1. A heat driven turbine comprising:
   a rotor having a cylindrical shape and including a plurality of curved members extending from a center of said rotor, said plurality of curved members spaced about a circumference of said rotor;
   a base supporting said rotor; and
   a plurality of vanes extending from each of said curved members of said rotor, said vanes each fabricated of at least two separate materials, said at least two separate materials having different coefficients of expansion whereby exposure to a heat source causes said at least two separate materials to expand at different rates thereby re-shaping the vanes to rotationally drive the rotor relative to said base.

2. The heat driven turbine of claim 1 wherein said vanes include cutouts.

3. The heat driven turbine of claim 1 wherein said vanes comprise one or more layers of each of said at least two separate materials.

4. The heat driven turbine of claim 1 further comprising an axle on which said rotor is positioned.

5. The heat driven turbine of claim 1 further comprising a generator connected to said rotor.

6. The heat driven turbine of claim 1 wherein said at least two separate materials are thermobimetals.

7. The heat driven turbine of claim 1 wherein said heat source is radiant, convection and/or conduction type heat.

8. A heat driven turbine comprising:
   an elongated rotor having a cylindrical shape and including a plurality of curved members extending from a center of said rotor, said plurality of curved members spaced about a circumference of said rotor;
   a base supporting said rotor; and
   a plurality of vanes extending from each of said curved members of said rotor such that multiple vanes extend from said rotor along its width via each of said curved members, said vanes each fabricated of at least two separate materials, said at least two separate materials having different coefficients of expansion whereby exposure to a heat source causes said at least two separate materials to expand at different rates thereby re-shaping the vanes to rotationally drive the rotor relative to said base, one or more of said plurality of vanes including one or more cut-outs.

9. The heat driven turbine of claim 8 wherein said vanes comprise one or more layers of each of said at least two materials.

10. The heat driven turbine of claim 8 further comprising an axle on which said rotor is positioned.

11. The heat driven turbine of claim 8 further comprising a generator connected to said rotor.

12. The heat driven turbine of claim 8 wherein said at least two separate materials are thermobimetals.

13. The heat driven turbine of claim 8 wherein said heat source is radiant, convection and/or conduction type heat.

* * * * *